J. K. GOIN.
FORM OR MOLD FOR CONCRETE.
APPLICATION FILED OCT. 3, 1910.
1,016,140.
Patented Jan. 30, 1912.
2 SHEETS—SHEET 2.
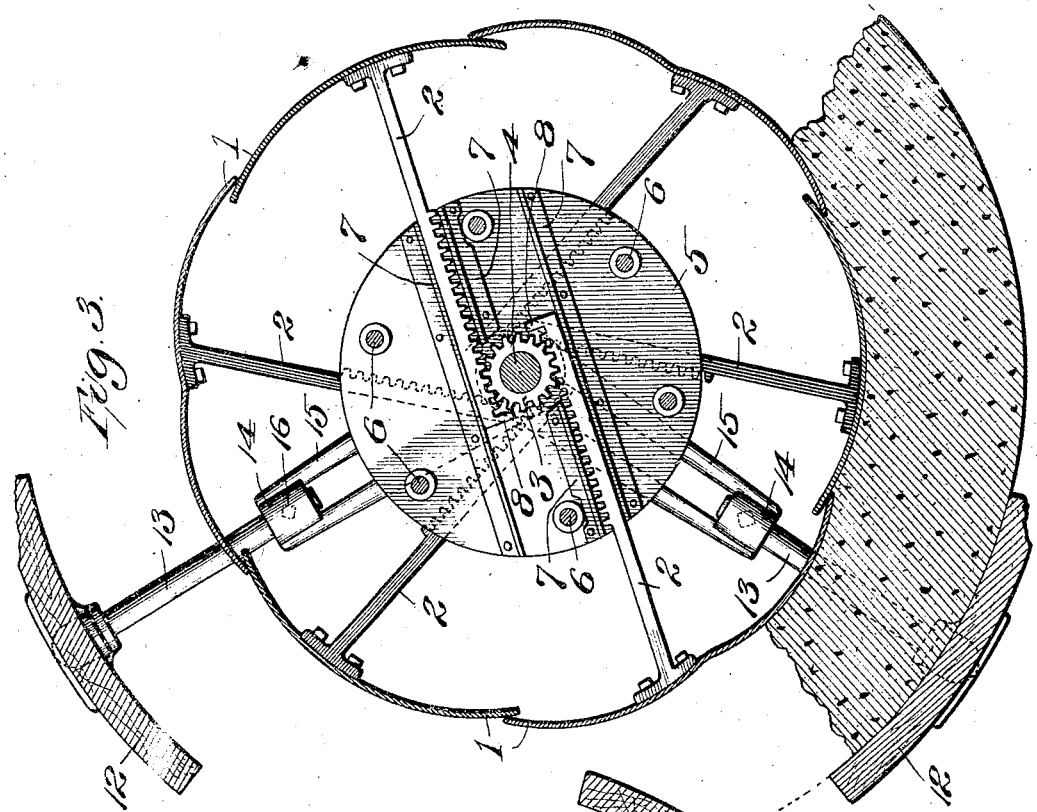
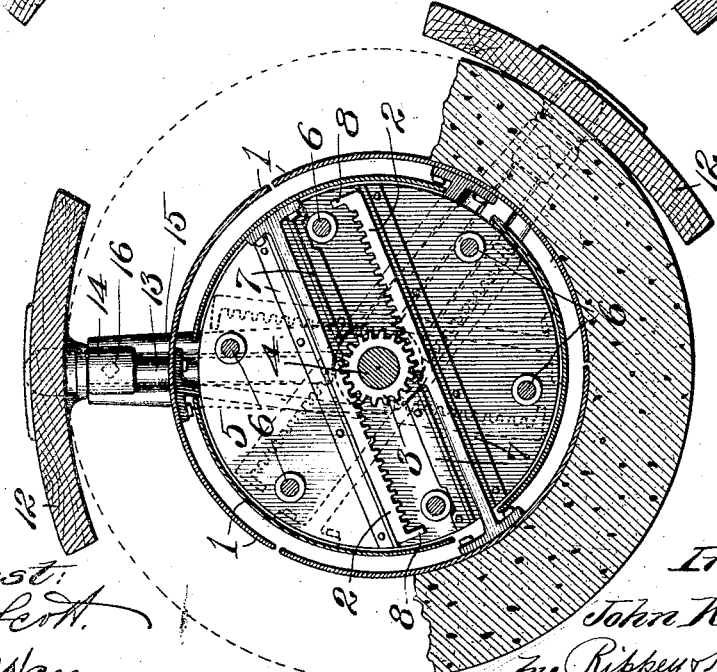
Attest:
Wm H Scott
John C Hall
Inventor:
John K. Goin,
by Rippey & Kingsland
Attys

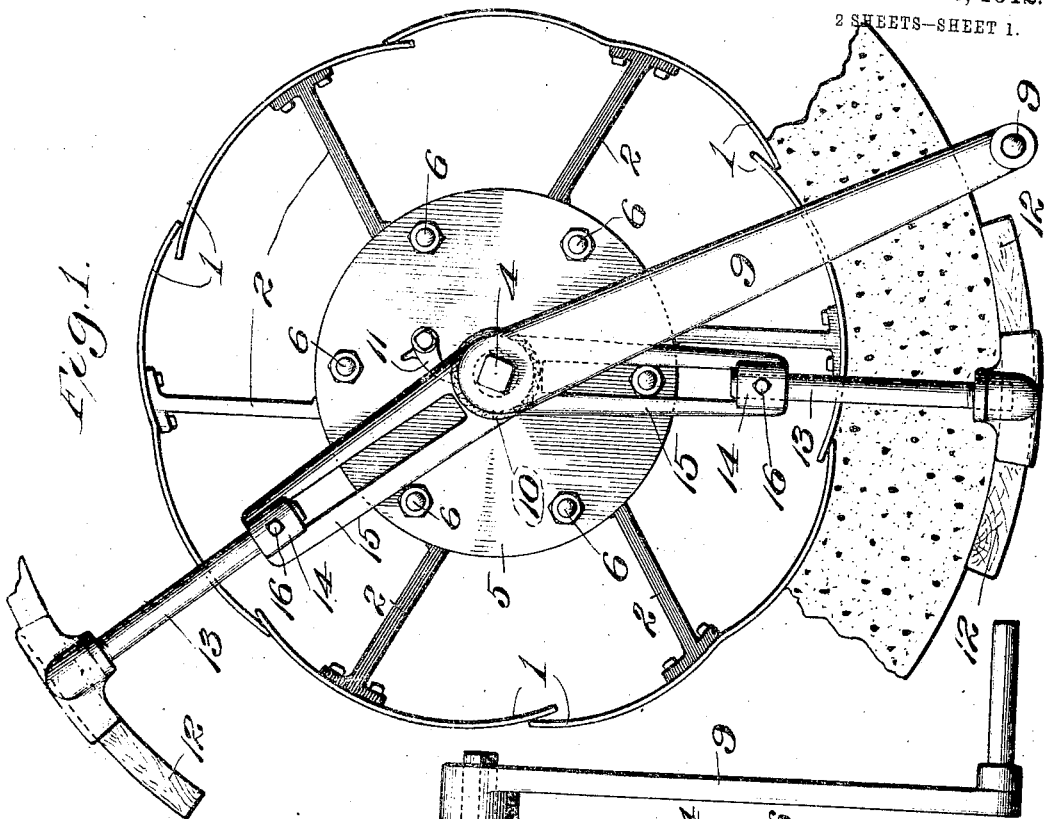

UNITED STATES PATENT OFFICE.

JOHN K. GOIN, OF ST. LOUIS, MISSOURI.

FORM OR MOLD FOR CONCRETE.

1,016,140.

Specification of Letters Patent.

Patented Jan. 30, 1912.

Application filed October 3, 1910. Serial No. 584,967.

*To all whom it may concern:*

Be it known that I, JOHN K. GOIN, a citizen of the United States, residing at St. Louis, Missouri, have invented a new and useful Form or Mold for Concrete, of which the following is a specification.

This invention relates to forms of molds for the formation of concrete structures, such as conduits, bridges and other hollow structures, and it has for its primary object to provide an adjustable form or mold comprising a series of mold wall-sections and mechanism operable to adjust and hold said sections in any predetermined relation or adjustment.

Another object is to provide a form or mold composed of a series of wall-sections and a central operating shaft, in combination with the connections entraining said sections with said shaft whereby rotation of said shaft will move said sections simultaneously and uniformly, and a device for holding the parts adjusted in any adjustment in which they may be placed.

Another object is to provide a form or mold for shaping interior surfaces of hollow objects formed of plastic material, which mold comprises a series of sections and operating mechanism for retracting or moving said sections effectively to "collapse" or reduce the mold so that it may readily be withdrawn after the plastic material has assumed proper shape and has become hardened or solidified.

There are other objects involving detailed construction and arrangment of the various parts embodied in the invention, all of which will be apparent to those skilled in the art to which this invention relates, without specific mention thereof.

In the accompanying drawings in which I have illustrated a convenient and preferred form of my improved form of mold—

Figure 1 is an end elevation of the form or mold. Fig. 2 is a longitudinal sectional view of a portion of the form or mold, illustrating the connections entraining the mold wall-sections with the central controlling and operating shaft. Fig. 3 is a cross sectional view on the line *a—a* of Fig. 2, showing the mold or form in its adjustment to the entraining connections whereby the wall-sections are guided and held in proper position and relation to each other. Fig. 4 is a similar sectional view illustrating the mold in its reduced or collapsed adjustment for the formation of smaller structures, such as conduits, bridges, etc.

The wall of the form or mold comprises a series of metallic sections which may be of sufficient length to form and complete the bridge or conduit. Said sections 1 are arcuate in cross-section and near each end of each section a rack 2 is attached, said racks constituting supports for the various wall sections. The racks 2 mesh with pinions 3 attached to the central operating shaft 4. There is one pinion for each pair of wall-sections, this arrangement being required since only two oppositely moving racks can be meshed with one pinion, which will be readily understood by reference to Fig. 3, in which two of said racks are shown entrained with a pinion. This requires the use of a number of pinions near each end of the form or mold, and said pinions are separated from each other by disks 5. The racks 2 operate between the disks 5, which are secured together by bolts 6, a number of said bolts extending from end to end of the form or mold, thereby connecting the plates 5 at opposite ends of the mold and bracing them in proper relative adjustment. The racks 2 operate between the disks 5 and are held from displacement by guide pieces 7 which will support the racks and thereby the wall-sections in proper relative adjustment. The inner end of each rack is provided with an elongated tooth or extension 8 which, by engagement with the pinion 3, will prevent further outward movement of the rack, which would result in disconnection of the parts.

A crank or handle 9 is detachably connected to one end of the shaft 4 and constitutes means for manual rotation of said shaft whereby the mold wall-sections may be operated.

To hold the form or mold in its various adjustments and prevent compression or collapse thereof, I provide a ratchet wheel 10 which is secured to the shaft 4 and with which a pawl 11 carried by the outer plate 5 engages. Said pawl and ratchet constitute a latch which will firmly hold the shaft against backward rotation until released. This will insure the form or mold remaining properly adjusted until the work of shaping the plastic material has been completed.

While I have described the racks 2 as being connected to the ends of the wall-sections, I do not restrict myself to this arrangement, since it is obvious that there may be additional racks employed and connected to the wall-sections intermediate of the ends. Indeed this latter arrangement might be found desirable in forms or molds of more than 8 or 10 feet in length, since the racks constitute strengthening braces to support the wall-sections in proper position and to prevent their compression by the weight of the heavy plastic material. The particular embodiment shown is a form capable of adjustment from about 12 to 14 inches in diameter to about 28 to 30 inches in diameter and comprises six longitudinal wall sections, all of which are brought into use in the larger adjustments, and three of which are employed in the smaller adjustment. This arrangement has been found satisfactory in the form or mold of these dimensions, but may well be varied to meet different requirements, and I do not restrict myself to any specific number of wall sections.

In order to assist in determining the proper thickness of the walls, I provide auxiliary swinging sections 12 to the ends of which are connected rods 13, said rods 13 operate through collars 14 on the arms 15 which swing from the shaft 4; set-screws 16 in the collars 14 are adjustable to bind the rods 13, so as to hold the auxiliary sections 12 at any desired distance away from the wall of the form or mold. These sections 12 may be moved to any desired adjustment or may be removed entirely if desired. They will be found useful however, in the formation of conduits constituting bridges, etc.

In using the device to form conduits, bridges, etc., the bottom layer of the plastic material is first deposited and the form or mold is placed thereon in proper adjustment. The auxiliary sections 12 are properly adjusted and the spaces between said auxiliary sections and the wall of the form or mold are filled with the plastic material or concrete, which is allowed to solidify and harden. The auxiliary sections 12 are then raised above the hardened portion and the spaces thus formed are filled with the concrete or other plastic material used, which is also permitted to harden and solidify. This operation is repeated until the entire conduit or bridge is completed. After the plastic material has all become hardened, the latch or lock opposite the ratchet wheel 10 and the pawl 11 is released, and the shaft 4 is rotated manually to retract or draw inwardly the mold wall-sections, thereby reducing the mold or form so that it may readily be withdrawn from the interior of the conduit, bridge or the like.

I am aware that there may be various other arrangements and various modifications within equivalent limits without departure from the nature and scope of my invention. I do not restrict myself to specific details, but

What I claim and desire to secure by Letters Patent is;—

1. A form comprising a series of arcuate wall-sections, a shaft, a series of plates loosely mounted on said shaft, a binding device holding said plates in proper position, racks having their outer ends connected to said wall-sections and extending between said plates, pinions mounted on said shaft between said plates in mesh with said racks, guides attached to said plates holding said racks in mesh with said pinions, means for operating said shaft effectively to reduce or enlarge said form, a latch device holding said shaft from backward rotation, arms swinging from said shaft, and auxiliary sections supported by said arms, substantially as described.

2. A form or mold comprising a series of wall-sections, a shaft, pinions attached to said shaft, plates loosely mounted on said shaft forming spaces in which said pinions are located, a binding device holding said plates in proper adjustment, racks in mesh with said pinions between said plates and having their outer ends attached to said wall-sections, a handle for turning said shaft, a latch device holding said shaft, arms pivoted upon said shaft, rods adjustably connected to said arms, and outer auxiliary sections connected to said rods whereby the thickness of the molded material may be determined, substantially as specified.

3. A form or mold comprising in combination, a series of overlapping wall-sections, a shaft, pinions attached to said shaft, racks meshing with said pinions and having their outer ends connected to said wall-sections, respectively, elements separating said pinions and holding said racks and said pinions from lateral movement, guides supporting and holding said racks in mesh with said pinions, and means for rotating said shaft effectively to form a complete mold wall composed of all or a less number of said wall sections, substantially as specified.

4. The combination with a series of overlapping wall-sections, and a shaft, of pinions attached to said shaft, racks meshing with said pinions and having their outer ends connected to said wall-sections, respectively, elements holding said racks in mesh with said pinions, supporting guides between said elements for said racks, means for rotating said shaft effectively to adjust all of said wall-sections in operative adjustment as required to constitute complete hollow forms or molds of various sizes, or to adjust a less number of said wall-sections in the form of a complete hollow mold, and a latch device effective to hold said shaft and wall-sections in their different adjustments aforesaid, substantially as specified.

5. The combination with a series of overlapping wall-sections, and a shaft, of pinions attached to said shaft, racks meshing with said pinions and having their outer ends rigidly connected to said wall-sections, respectively, elements holding said racks and said pinions from lateral movement, supporting guides holding said racks in mesh with said pinions, means for rotating said shaft effectively to adjust all or a less number of said wall-sections in operative adjustment as required to constitute walls for complete hollow molds of various sizes from a relatively small mold to a relatively large mold, a latch device effective to hold said shaft and wall-sections in their different adjustments, arms swinging from said shaft, and auxiliary sections supported by said arms, substantially as specified.

6. A form or mold comprising a series of wall-sections, a shaft, pinions attached to said shaft, plates loosely mounted on said shaft and forming spaces in which said pinions are located, racks in mesh with said pinions between said plates and having their outer ends attached to said wall-sections, guides for said racks attached to said plates, a handle for turning said shaft, and a latch device holding said shaft, substantially as specified.

7. A form or mold comprising a series of wall-sections, a shaft, pinions attached to said shaft, plates loosely mounted on said shaft and forming spaces in which said pinions are located, binding devices holding said plates in proper adjustment, racks in mesh with said pinions between said plates and having their outer ends attached to said wall-sections, guides for said racks attached to said plates, a handle for turning said shaft, arms pivoted upon said shaft, and auxiliary sections connected to said arms, substantially as specified.

8. A form or mold comprising a series of wall-sections, a shaft, pinions attached to said shaft, plates loosely mounted on said shaft and forming spaces in which said pinions are located, means holding said plates in proper adjustment, guides attached to said plates, racks extending between said plates and between said guides in mesh with said pinions and having their outer ends attached to said wall-sections, a handle for turning said shaft, and auxiliary sections connected to said shaft whereby the thickness of the molded material may be determined, substantially as specified.

9. In a mold, the combination with a central shaft, and overlapping wall-sections, of racks entraining said overlapping wall-sections with said shaft, disks preventing lateral movement of said racks, supporting guides between said disks for said racks, and means for operating said shaft effectively to withdraw a number of said sections from the surface of the form or mold and form a complete annular mold with the remainder of said sections, substantially as specified.

10. In a mold the combination with a central shaft, and overlapping sheet metal wall-sections, of racks entrained with said shaft and having their outer ends connected to said wall-sections, plates preventing lateral movement of said racks, guides for said racks between said plates, and means for operating said shaft and said racks effectively to withdraw a number of said sections from the surface of the form or mold and form a complete annular mold with the remainder of said sections, substantially as specified.

11. In a mold, the combination with a central shaft, and overlapping sheet metal wall-sections, of racks entrained with said shaft and having their outer ends connected to said wall-sections, a plate on each side of said racks, guides attached to said plates holding said racks from lateral movement, means for operating said shaft effectively to withdraw a number of said sections from the surface of the form or mold and form a complete relatively much smaller annular mold with the remainder of said sections, and auxiliary forms connected to said shaft whereby the thickness of the molded material may be determined, substantially as specified.

In witness whereof I have signed this specification in the presence of two subscribing witnesses.

JOHN K. GOIN.

Witnesses:
  A. C. WONDELL,
  L. C. KINGSLAND.